United States Patent Office 3,442,937
Patented May 6, 1969

3,442,937
PROCESS FOR STABILIZING SOLUTIONS OF ALIPHATIC PERCARBOXYLIC ACIDS
Kurt Sennewald, Knapsack, near Cologne, Heinrich Rehberg, Hermulheim, near Cologne, and Günter Lenz, Frechen, Germany, assignors to Knapsack Aktiengesellschaft, Knapsack, near Cologne, Germany, a corporation of Germany
No Drawing. Filed Oct. 8, 1965, Ser. No. 494,242
Claims priority, application Germany, Oct. 22, 1964, K 54,320
Int. Cl. C07c 73/10
U.S. Cl. 260—502                        5 Claims

ABSTRACT OF THE DISCLOSURE

A stabilized percarboxylic acid composition and process for stabilizing aliphatic percarboxylic acid solutions by admixing into the percarboxylic acid solution, an active stabilizing amount of
(a) Quinoline or salt thereof;
(b) Alakli metal polyphosphate; and optionally
(c) A synergistic amount of urea.

The present invention relates to a process for stabilizing solutions of aliphatic percarboxylic acids by adding thereto a small amount of a stabilizer mixture consisting of quinoline or a quinoline salt and a condensed phosphate.

Percarboxylic acids are known to be unstable compounds which in the course of time undergo decomposition by an exothermal reaction. The decomposition can be initiated or promoted by various factors, e.g. by the presence of heavy metal ions, such as iron, copper, cobalt or manganese ions. Percompounds substantially more unstable than the percarboxylic acid themselves and included in the latter in the form of impurities, e.g. the addition compounds of percarboxylic acids with aldehydes, may also induce decomposition of the peracids. High temperatures and certain pH-ranges also promote the decomposition of percarboxylic acids.

As one of these factors affecting the stability of percarboxylic acids is always met during the preparation or storage of percarboxylic acids, it is convenient to stabilize these acids with an appropriate agent.

U.S. specifications Nos. 2,590,856 and 2,347,434 teach stabilizing a dilute aqueous solution of an aliphatic percarboxylic acid, where the solution has a temperature of 25 to 100° C. and a pH-value of not less than 4, by adding thereto an alkali metal or ammonium pyrophosphate or a polyphosphate to serve as a stabilizer, which should be used in a concentration of 0.01 to 0.1% by weight, referred to the percarboxylic acid solution. The stabilizing effect produced by a stabilizer as defined by its half-life period, which means the period after which a peracid solution undergoes a 50% decomposition, lasts for 24 hours when sodium hexametaphosphate is used as the stabilizer as proposed in U.S. specification No. 2,590,856.

It is the object of the present invention to improve the stability of percarboxylic acids beyond a degree of stability such as obtainable heretofore, by the addition of a certain stabilizer mixture, which means more favorable conditions for preparation, manipulation and storage of percarboxylic acids.

The process of the present invention for stabilizing solutions of aliphatic percarboxylic acids comprises admixing an aliphatic percarboxylic acid solution in an inert solvent, where the solution may also contain minor proportions of a heavy metal salt, with a stabilizer mixture consisting of quinoline or a quinoline salt and a condensed phosphate, and optionally increasing the effect produced by the stabilizer by adding a small proportion of urea to serve as a synergist.

The acids which can be stabilized preferably include aliphatic percarboxylic acids having at most 4 carbon atoms, and more preferably peracetic acid. Suitable inert solvents for the percarboxylic acids include acetone, methyl acetate or ethyl acetate, or a mixture of one of these solvents with a carboxylic acid corresponding to the percarboxylic acid. The percarboxylic acid solutions to be stabilized generally contain about 20% by weight percarboxylic acid. It is evident that percarboxylic acid solutions having a percarboxylic acid content higher or lower than indicated above can also be stabilized with the stabilizer of the present invention to avoid decomposition thereof.

Each of the stabilizer components, i.e. the quinoline and condensed phosphate, should conveniently be used in a concentration of about 0.01 to about 0.1% by weight, referred to the solution. As already mentioned above, the quinoline can be replaced with a salt of this base, e.g. with the quinoline salt with hydrochloric acid, sulfuric acid, rothophosphoric acid or acetic acid. The stabilizing effect of quinoline must likely be attributed to the N-quinoline oxide, which is formed upon the action of peracid, and which also is a good stabilizer. The second stabilizer component is preferably an alkali metal polyphosphate, and more preferably sodium tripolyphosphate or sodium hexametaphosphate.

A further feature of the process of the present invention comprises improving the activity of the stabilizer mixture, which consists of quinoline and a condensed phosphate, by the addition of a small proportion of urea. The action of urea is based on a synergistic effect, as urea alone cannot be used as an agent inhibiting the decomposition of peracids. The urea should be added in a concentration of about 0.01 to about 0.1% by weight, referred to the peracid solution.

The effect produced by the stabilizer of the present invention in the stabilization of percarboxylic acids can also be produced when the peracid solution contains small proportions of a heavy metal salt, which is known to induce or accelerate the decomposition of the peracid. Salts accelerating the decomposition include those of iron, copper, cobalt or manganese.

The activity of the present stabilizer as compared with conventional agents, such as sodium tripolyphosphate or sodium hexametaphosphate, is demonstrated in the following working examples with respect to the half-life period, which means the time after which 50% of the initial peracid proportion has undergone decomposition. The decomposition process was controlled by iodometric titration of samples taken from test solutions in certain intervals of time. It is obvious that e.g. peracetic acid solutions admixed with the present stabilizer have a substantially improved stability. This effect is the more significant as percarboxylic acids are oxydants which are frequently used in industry, but which heretofore had a very limited stability.

EXAMPLE 1

The decomposition period of 22% by weight solutions of peracetic acid in ethyl acetate, which also continued 10% by weight acetic acid, was determined in comparatuve tests at a temperature of 25° C. in the presence of the following stabilizers:
 (a) Quinoline,
 (b) Sodium tripolyphosphate,
 (c) Sodium hexametaphosphate,
 (d) Mixture of quinoline and sodium tripolyphosphate.
The individual stabilizers were used in the peracetic acid solutions in a concentration of 0.02% by weight. The decrease in peracetic acid content of the solutions was determined by iodometric titration of samples taken from the solutions in certain intervals of time. The tests were interrupted as soon as 50% of the peracetic in the solution had decomposed. The time needed for this, defined hereafter as half-life period, is a criterion for the activity of the single stabilizers. The half-life periods indicated in the following Table 1 were found for the single stabilizers.

Table 1

| Stabilizer: | Half-life period (hrs.) |
|---|---|
| No stabilizer | 220 |
| Quinoline | 800 |
| Sodium tripolyphosphate | 1100 |
| Sodium hexametaphosphate | 830 |
| Mixture of quinoline and sodium tripolyphosphate | 4200 |

EXAMPLE 2

Four different samples were tested to determine the decomposability of peracitic acid within 5 days. Each sample consisted of 1 liter of a 20.5% by weight solution of peracetic acid in acetone; the solution had been heated at 50° C. and contained 6% by weight acetic acid. As compared with unstabilized sample 1, sample 2 had been stabilized with 0.05% by weight quinoline and 0.05% by weight sodium tripolyphosphate. In sample 3, which was free from stabilizer, the decomposition of the peracetic acid was favored by adding 10 milligrams iron-trichloride. Sample 4 differed from sample 3 by the fact that 0.05% by weight quinoline and 0.05% by weight sodium tripolyphosphate had been added to sample 4. The decrease in peracetic acid content during the testing period was determined by iodometric titration as in Example 1. The test results obtained are indicated in the following Table 2.

Table 2

| Sample No: | Paracetic acid content after after 5 days in percent by wt. |
|---|---|
| 1 | 4,6 |
| 2 | 18.2 |
| 3 | 0.2 |
| 4 | 16.4 |

EXAMPLE 3

The half-life period of a 22% by weight solution of paracetic acid in ethyl acetate, which also contained 10% by weight acetic acid, was determined in a manner analogous to that described in Example 1 at a temperature of 25° C. As compared with unstabilized sample 1, sample 2 had been stabilized by adding 3 cc. of a solution consisting of 0.1 gram sodium tripolyphosphate,
0.1 gram quinoline, and
0.1 gram urea, dissolved in 40% acetic acid.

Unstabilized sample 1 was found to have a half-life period of 200 hours, whereas sample 2 indicated a 50% loss of the initial peracetic acid content after a period as long as 4,500 hours.

We claim:
1. Percarboxylic acid composition consisting essentially of
  (A) an aliphatic percarboxylic acid having up to 4 carbon atoms;
  (B) an active stabilizing amount of
  (C) an active stabilizing amount of
    (1) quinoline, or corresponding salt thereof with an acid selected from the group consisting of hydrochloric acid, orthophosphoric acid, sulfuric acid and acetic acid; and
    (2) alkali metal polyphosphate.
2. The composition of claim 1 containing a synergistic amount of urea.
3. The composition of claim 1 wherein the percarboxylic acid solution contains a small proportion of heavy metal ions selected from the group consisting of iron, copper, cobalt and manganese.
4. The composition of claim 1 wherein the percarboxylic acid is peracetic acid.
5. The composition of claim 1 wherein the alkali metal polyphosphate is sodium tripolyphosphate or sodium hexametaphosphate.

References Cited

UNITED STATES PATENTS 3,168,554   2/1965   Phillips et al. _____ 260—502

FOREIGN PATENTS 679,307   2/1964   Canada.

BERNARD HELFIN, *Primary Examiner.*

W. B. LONE, *Assistant Examiner.*

PO-1050
(5/69)

UNITED STATES PATENT OFFICE
CERTIFICATE OF CORRECTION

Patent No. 3,442,937                    Dated May 6, 1969

Inventor(s) Kurt Sennewald and Gunter Lenz

It is certified that error appears in the above-identified patent and that said Letters Patent are hereby corrected as shown below:

Column 1, line 22, the word "Alakli" should read -- Alkali --. Column 2, line 23, the word "rothophosphoric" should read -- orthophosphoric --. Column 2, line 64, the word "continued" should read -- contained --. Column 2, lines 65-66, the word "comparatuve" should read -- comparative --. Column 4, line 1, the word "paracetic" should read -- peracetic --. In claim 1, line 19, column 4, "active stabilizing amount of" should read -- inert solvent and --.

Signed and sealed this   19th   day of   May 1970.

(SEAL)
Attest:

Edward M. Fletcher, Jr.
Attesting Officer

WILLIAM E. SCHUYLER, JR.
Commissioner of Patents